US009615157B2

(12) United States Patent
Naito et al.

(10) Patent No.: US 9,615,157 B2
(45) Date of Patent: Apr. 4, 2017

(54) MICROPHONE

(71) Applicant: KABUSHIKI KAISHA AUDIO-TECHNICA, Machida-shi, Toyko (JP)

(72) Inventors: Yoshihiko Naito, Machida (JP); Akira Masuda, Machida (JP)

(73) Assignee: KABUSHIKI KAISHA AUDIO-TECHNICA, Machida-shi, Tokyo (JP)

( * ) Notice: Subject to any disclaimer, the term of this patent is extended or adjusted under 35 U.S.C. 154(b) by 0 days.

(21) Appl. No.: 14/920,238

(22) Filed: Oct. 22, 2015

(65) Prior Publication Data

US 2016/0142804 A1 May 19, 2016

(30) Foreign Application Priority Data

Nov. 14, 2014 (JP) ................................ 2014-231260

(51) Int. Cl.
*H04B 15/00* (2006.01)
*H04R 1/04* (2006.01)
*H04R 3/00* (2006.01)
*H04R 1/06* (2006.01)

(52) U.S. Cl.
CPC ................ *H04R 1/04* (2013.01); *H04R 1/06* (2013.01); *H04R 3/00* (2013.01); *H04R 2420/07* (2013.01)

(58) Field of Classification Search
CPC .................................. H04R 1/083; H04R 3/00
See application file for complete search history.

(56) References Cited

U.S. PATENT DOCUMENTS 4,910,795 A * 3/1990 McCowen ............ H04R 1/083 381/355
8,571,238 B2 * 10/2013 Plath ..................... H04R 1/083 381/122

FOREIGN PATENT DOCUMENTS

CN 002348528 Y * 11/1999
JP H02-126497 U 10/1990

* cited by examiner

*Primary Examiner* — Regina N Holder
(74) *Attorney, Agent, or Firm* — Manabu Kanesaka

(57) ABSTRACT

Provided is, in a microphone configured such that a microphone head including a microphone unit is attachably/detachably mounted to a microphone main body, a microphone which enables easy attachment/detachment of the microphone head, and which can perform a mute operation not only after removal of the microphone head but also in attachment/detachment of the microphone head. The microphone includes a mute circuit provided to a side of the microphone main body, and driven by an input of a mute command signal, a first mute control circuit provided to aside of the microphone head, and including a switch that switches disconnection/conduction of a wire, and a second mute control circuit provided to the side of the microphone main body, and electrically connected with the first mute control circuit and generates the mute command signal, in a state where the microphone head is coupled, and in attachment/detachment of the microphone head.

5 Claims, 8 Drawing Sheets

MICROPHONE

RELATED APPLICATIONS

The present application is based on, and claims priority from, Japanese Application No. JP2014-231260 filed Nov. 14, 2014, the disclosure of which is hereby incorporated by reference herein in its entirety.

BACKGROUND OF THE INVENTION

Field of the Invention

The present invention relates to a microphone configured such that a microphone unit that performs sound collection is attachably/detachably mounted to a microphone main body, and especially relates to a microphone that can be muted in attachment/detachment.

Description of the Related Art

Conventionally, in wired or wireless microphones, there are ones configured such that a microphone head having a microphone unit built in is attachably/detachably coupled to a microphone main body. As a coupling method thereof, a configuration to fix the microphone head and the microphone main body with a special coupling structure, or a configuration to attach/detach a microphone head 52 to a microphone main body 51, using a screw mechanism 53, as illustrated in FIG. 9, are typically employed.

By the way, the microphone configured such that the microphone head is attachably/detachably coupled to the microphone main body as described above have a problem that a pop noise occurs in attachment/detachment. That is, if the microphone head is attached with/detached from a power source in a power-on state by mistake or on purpose, a large pop noise is caused, and the device may be damaged.

To handle the problem, JP 2-126497 Y discloses a configuration to operate/disconnect a mute circuit, using a phenomenon that connection of a microphone socket intermits according to attachment/detachment of a microphone unit, in a microphone circuit configured from the microphone socket and a microphone first-stage amplifier.

That is, by causing the mute circuit to function in a moment of insertion or removal of the microphone unit, the pop noise in attachment/detachment of the microphone unit is avoided.

However, in the case of the illustrated screw-type attachment/detachment configuration, the microphone head 52 needs to be relatively rotated with respect to the microphone main body 51 a number of times. Therefore, there are problems that not only labor is required, but also a rubbing noise is output as a noise, until the mute circuit is operated.

Further, there is a problem that the life of contacts becomes short or contact failure is caused due to friction of contacts, by the rotation of the microphone unit a number of times.

SUMMARY OF THE INVENTION

The present invention has been made in view of the foregoing, and an objective is to provide, in a microphone configured such that a microphone head including a microphone unit that performs sound collection is attachably/detachably mounted to a microphone main body, a microphone that enables easy attachment/detachment of the microphone head, and which can perform a mute operation not only after removal of the microphone head but also in attachment/detachment of the microphone head.

To solve the above-described problem, a microphone according to the present invention is a microphone having a microphone head attachably/detachably mounted to a microphone main body, the microphone head including a microphone unit that performs sound collection, and the microphone includes: a mute circuit provided to a side of the microphone main body, and configured to be driven by an input of a mute command signal; a first mute control circuit provided to a side of the microphone head, and including a switch that switches disconnection/conduction of a wire; and a second mute control circuit provided to the side of the microphone main body, and configured to be electrically connected with the first mute control circuit, and to generate the mute command signal, in a state where the microphone head is coupled, and in attachment/detachment of the microphone head, wherein the second mute control circuit outputs the mute command signal, in a state where the first mute control circuit and the second mute control circuit are electrically connected, and the wire of the first mute control circuit is conducted by the switch, or in a state where the first mute control circuit and the second mute control circuit are electrically disconnected.

With such a configuration, the mute circuit can be always driven by the switch during attachment/detachment. Therefore, occurrence of the pop noise can be prevented not only after removal of the microphone head from the microphone main body, but also in attachment/detachment of the microphone head.

Incidentally, it is desirable that the microphone head and the microphone main body are coupled by a bayonet-type coupling mechanism.

With such a bayonet-type coupling system, attachment/detachment of the microphone head becomes easy, and connection between the first mute control circuit and the second mute control circuit can be reliably performed.

In addition, it is desirable that the microphone includes a slide member provided in the microphone head, and configured to operate switching of the switch of the first mute control circuit, wherein, in a position of the slide member, where the wire of the first mute circuit is caused to be connected by the switch, rotation of the microphone main body around an axis is locked by the slide member.

By providing such a slide member, the switch needs to be slid in attachment/detachment of the microphone head. Therefore, the mute circuit can be driven in attachment/detachment of the microphone head.

Further, it is desirable that the microphone main body includes a main body member including the second mute control circuit connectable with the microphone head-side first mute control circuit and a cover member that covers the main body member, and the cover member is coupled to the microphone head side in a state of covering the slide member provided to the microphone head side.

As described above, the slide member is usually covered with the cover member, so that careless sliding of the slide member can be prevented.

In a microphone configured such that a microphone head including a microphone unit that performs sound collection is attachably/detachably mounted to a microphone main body, a microphone which enables easy attachment/detachment of the microphone head, and which can perform a mute operation not only after removal of the microphone head but also in attachment/detachment of the microphone head can be obtained.

DESCRIPTION OF THE PREFERRED EMBODIMENTS

Figure 1:
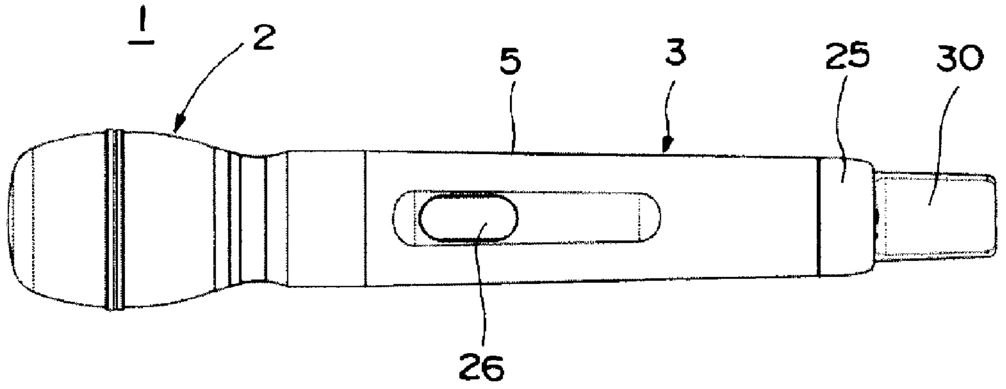
FIG. 1 is a plan view of a microphone according to the present invention.
Figure 2:
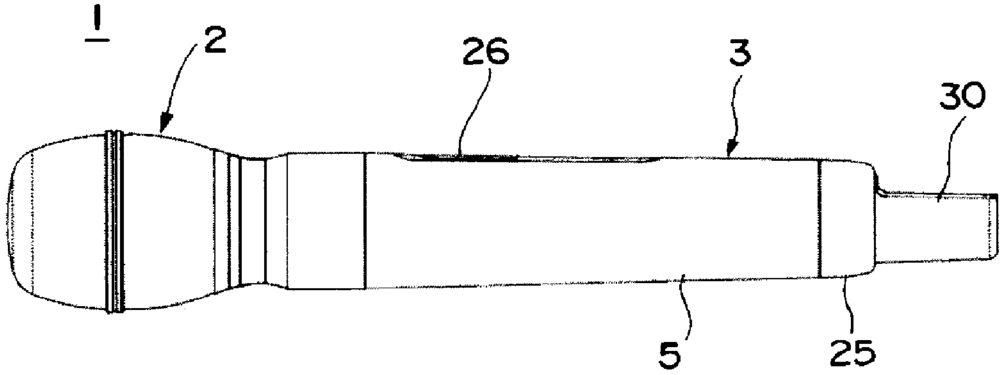
FIG. 2 is a side view of the microphone of FIG. 1.

Hereinafter, embodiments of the present invention will be described based on the drawings. FIG. 1 is a plan view of a microphone according to the present invention, and FIG. 2 is a side view of the microphone. Further, FIG. 3 is a sectional view illustrating an enlarged tip end side of the microphone.

An illustrated microphone 1 is configured from a microphone head 2 having a microphone unit (not illustrated) built in, the microphone unit performing sound collection, and a microphone main body 3 attachably/detachably provided to the microphone head 2. Note that, in the present embodiment, the microphone 1 illustrated in FIG. 1 is a wireless microphone, and provided with an antenna section 30 at a rear end portion of the microphone main body 3, and a display 26 on an peripheral surface.

Figure 3:
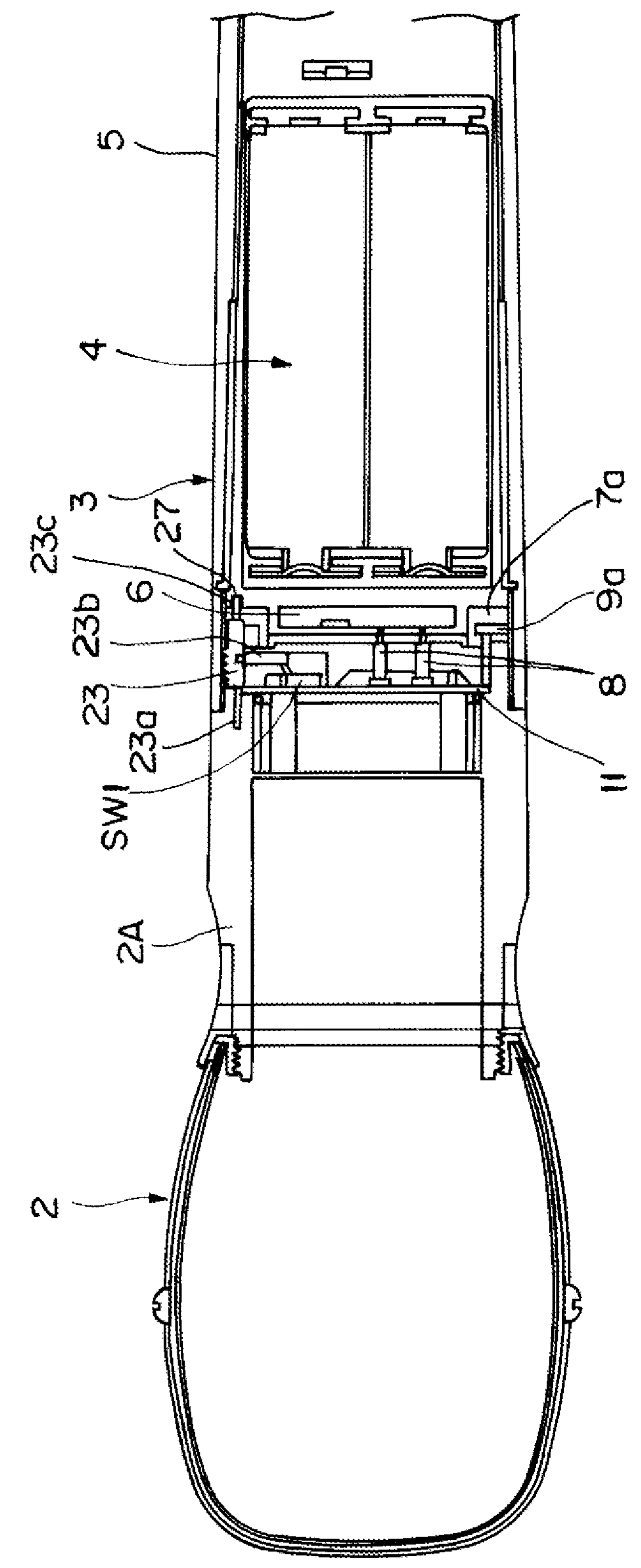
FIG. 3 is a sectional view illustrating an enlarged tip end side of the microphone of FIG. 1.

The microphone main body 3 is configured from, as illustrated in FIGS. 1 to 3, an audio substrate (not illustrated), an antenna substrate (not illustrated), a main body member 4 made of a battery and the like, a cylindrical cover member 5 made of metal, which houses the main body member 4, and a grip end member 25 coupled to a rear portion of the cover member 5. The main body member 4 and the cover member 5 are coupled with a side of the microphone head 2 independently of each other.

Figure 5:
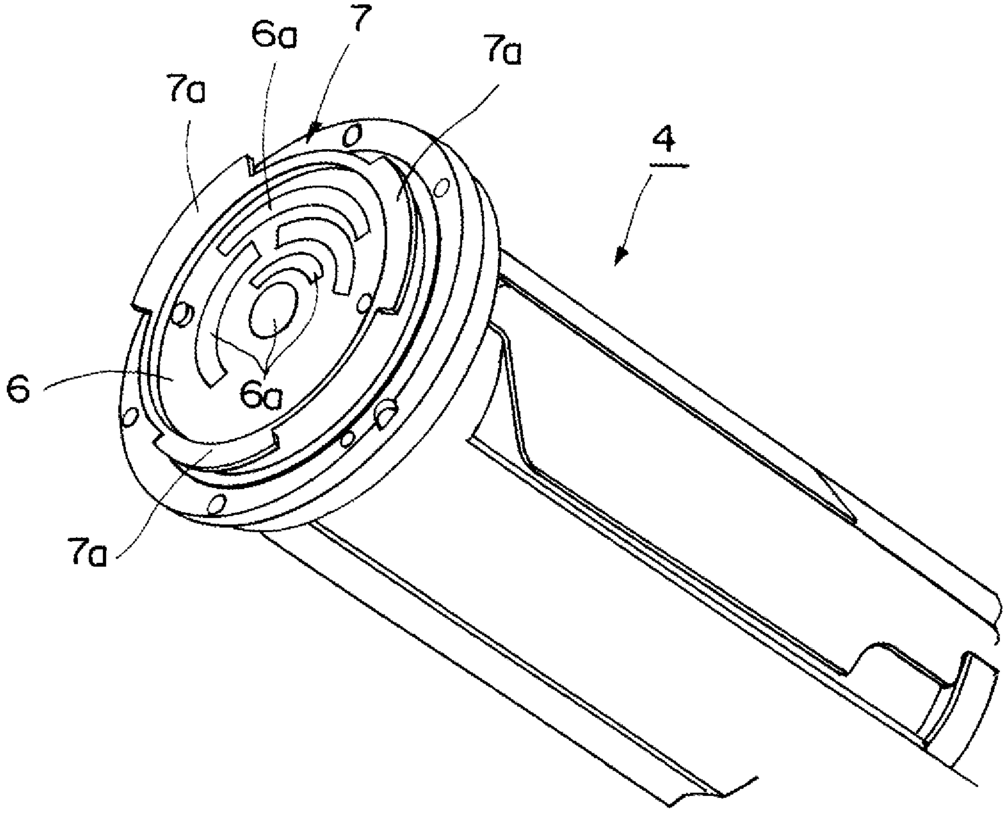
FIG. 5 is a perspective view of a main body member included in a microphone main body.

The main body member 4 includes, as illustrated in the perspective view of FIG. 5, a disk-like contact substrate 6 for transmitting/receiving an audio signal to/from the side of the microphone head 2, and a bayonet-type main body-side coupling portion 7 for being mechanically coupled with the side of the microphone head 2, in a tip end of the main body member 4. The main body-side coupling portion 7 includes three bayonet claws 7*a* formed to protrude outward around the contact substrate 6.

Further, a plurality of print patterns 6*a* (including main body-side terminals B1 and B2 described below) made of an ark-shaped copper wire is formed in the contact substrate 6 along a circumferential direction. Tip portions of a plurality of (five in the drawing) contact pins 8 (including microphone-side pins M1 and M2 described below) protruding to a lower end of the microphone head 2 and illustrated in the perspective view of FIG. 4 abut on these print patterns 6*a*, respectively, when the microphone head 2 is coupled with the main body member 4, and the contact pins 8 are slidable.

Figure 4:
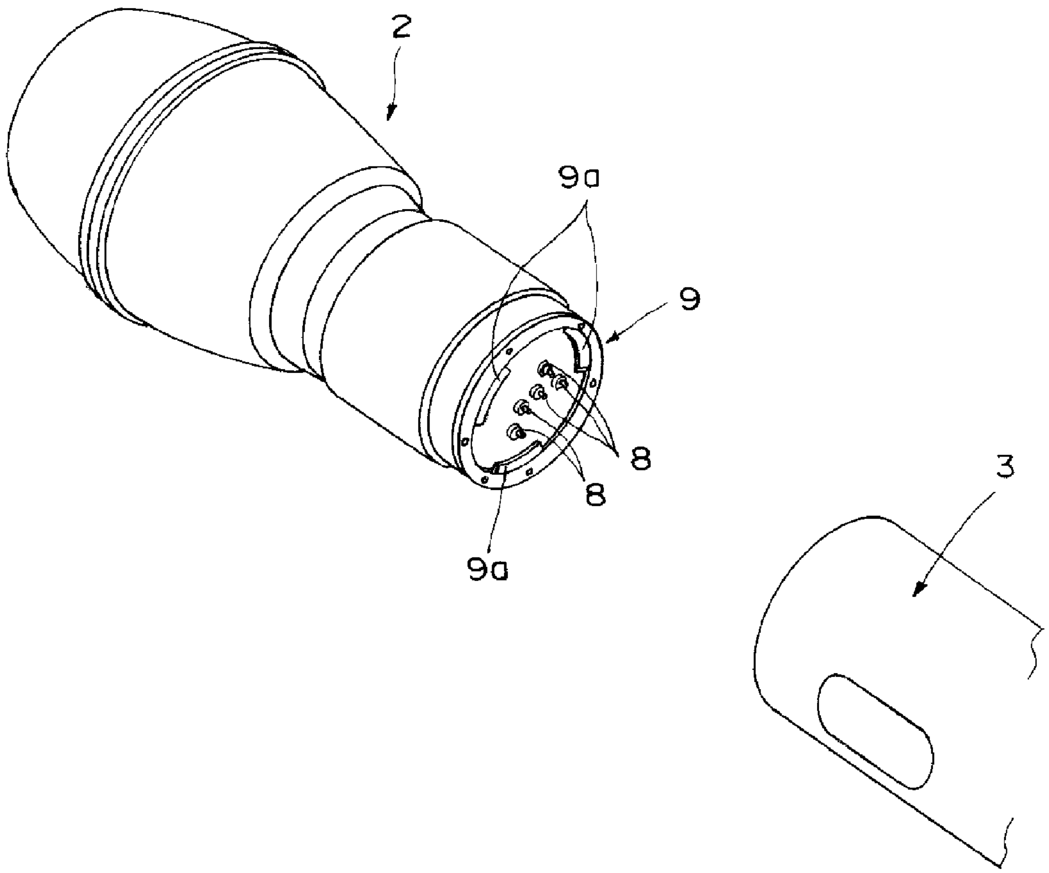
FIG. 4 is a perspective view illustrating a lower end side of a microphone head.

Further, as illustrated in FIG. 4, a head-side coupling portion 9 that is to be engaged with the main body-side coupling portion 7 provided in the tip end side of the main body member 4 is provided in a peripheral edge portion of the lower end of the microphone head 2. The head-side coupling portion 9 includes, for example, three bayonet claws 9*a* formed to protrude inward along the circumferential direction.

As described above, the microphone head 2 and the main body member 4 include the bayonet-type coupling portions 7 and 9 that can be coupled with each other. After a bayonet claw 8*a* is inserted into a space between the adjacent bayonet claws 7*a*, the microphone head 2 is rotated around an axis with respect to the main body member 4 by a predetermined angle (60 degrees in the present embodiment), so that the bayonet claws 7*a* and 8*a* are engaged with each other, and the microphone head 2 and the main body member 4 can be easily coupled.

Figure 6:
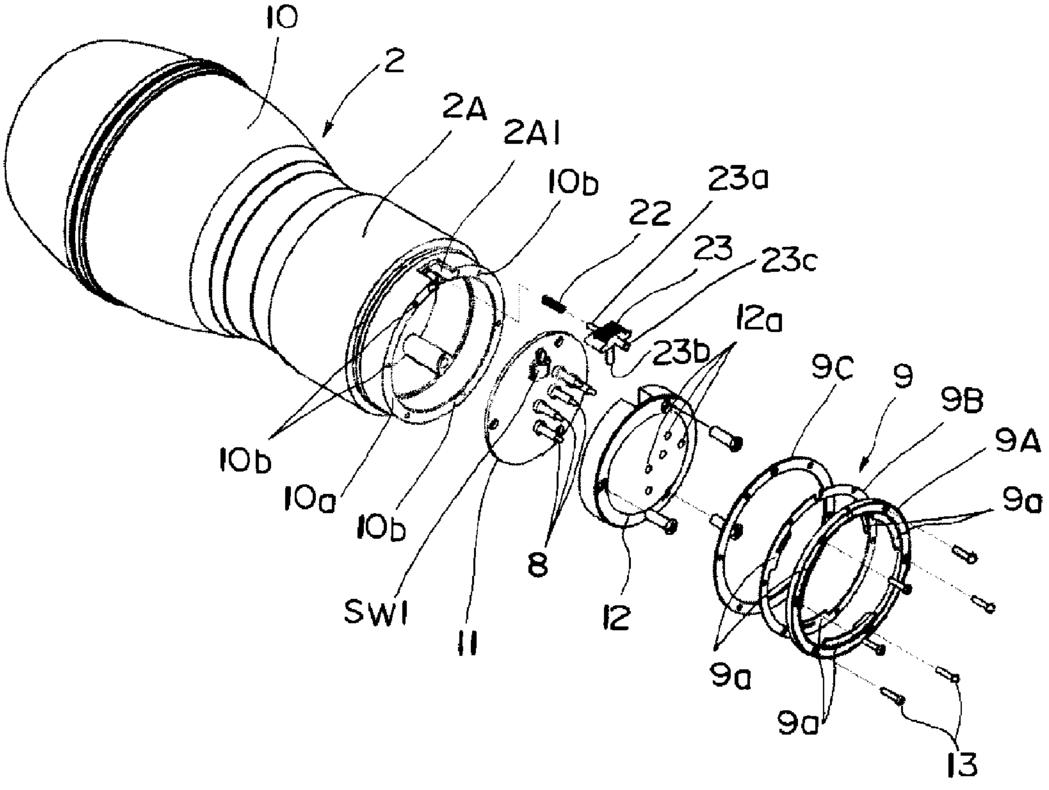
FIG. 6 is a perspective view of an exploded lower end side of the microphone head.

Further, as illustrated in the exploded diagram of FIG. 6, the microphone head 2 includes a head case 10 that houses the microphone unit (not illustrated) that performs sound collection, and a lower end side of the head case 10 is open. An annular receiving portion 10*a* for holding ring-like bayonet members 9A, 9B and 9C in a layered manner is provided to a peripheral edge portion of the lower end-side opening, and a plurality of screw holes 10*b* is formed in the receiving portion 10*a* along the circumferential direction. The bayonet members 9A, 9B, and 9C are formed into a ring shape with flat upper and lower surfaces, and are used in a mutually layered manner.

To be specific, the bayonet claws 9*a* are formed inside the bayonet members 9A and 9B, and further, the annular bayonet member 9C is layered thereon, so that a gap is formed in a rear side of the bayonet claws 9*a*. A plurality of through holes is formed in these bayonet members 9A, 9B, and 9C in the circumferential direction, and screws 13 are inserted into the through holes, screwed into the screw holes 10*b* of the receiving portion 10*a*, and attached to the receiving portion 10*a*.

Further, a contact substrate 11 in which the contact pins 8 are installed in a protruding manner can be attached to a side of the lower end-side opening of the head case 10, in a state of being covered with a cap member 12. A plurality of through holes 12*a* is formed in the cap member 12, and tip end sides of the contact pins 8 are allowed to protrude through these through holes 12*a*.

Figure 7:
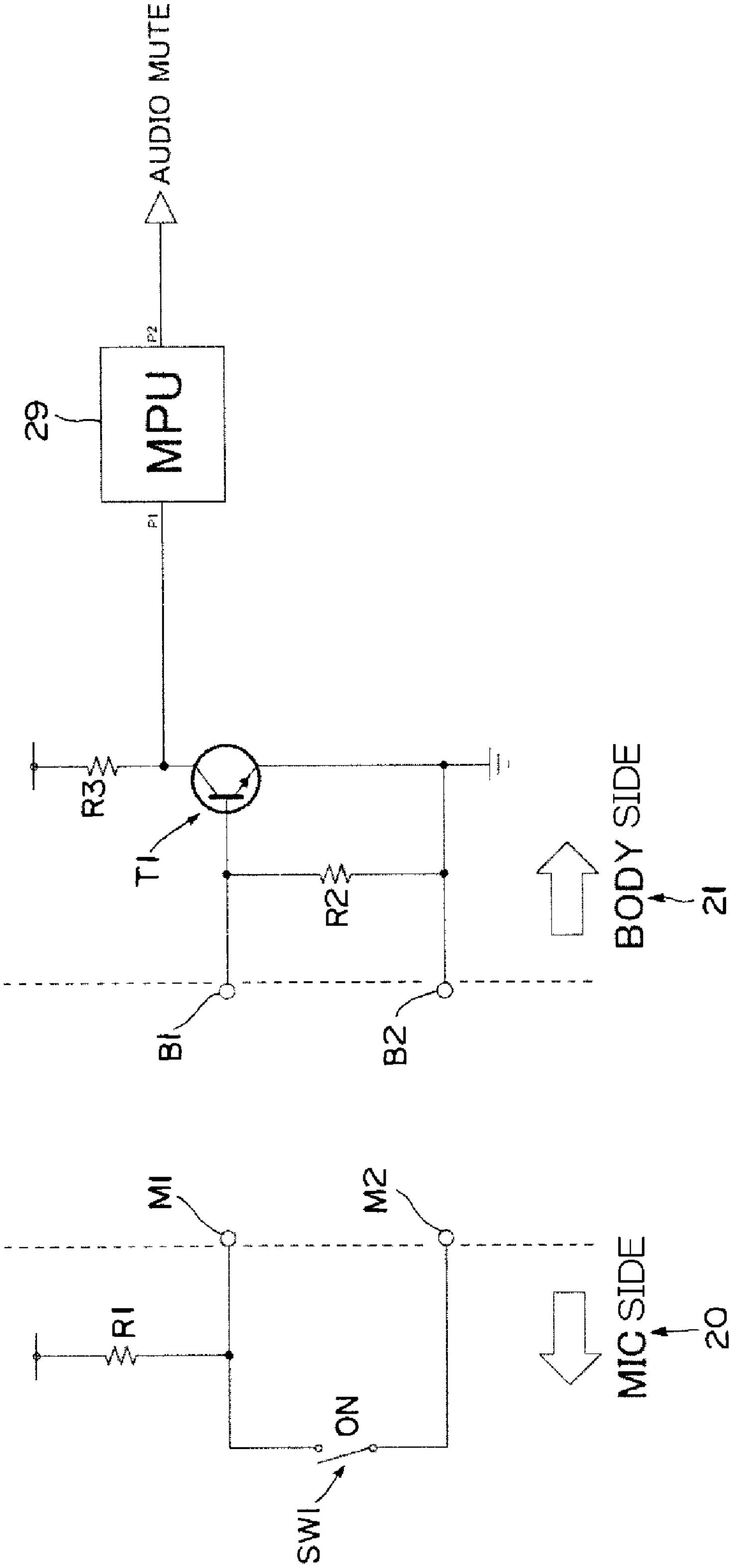
FIG. 7 is a microphone-side mute control circuit and a main body-side mute control circuit.

Further, a microphone-side mute control circuit 20 (first microphone mute control circuit) as illustrated in FIG. 7 is provided on the contact substrate 11. The mute control circuit 20 includes a microphone-side pin M1 hung on high (H) through a resistance R1, and a microphone-side pin M2 connected with the microphone-side pin M1 through a switch SW1.

As illustrated in FIG. 6, the switch SW1 is installed on the contact substrate 11. An ON/OFF operation of the switch SW1 is performed such that a slidably provided slide member 23 presses (SW1 is ON) or releases (SW1 is OFF) a guide portion 2A1 provided in a peripheral edge of a lower end portion of the head case 2A, with a sliding operation thereof.

The slide member 23 includes a spring support pin 23*a* protruding to a microphone tip end side, a pressing pin 23*b* that can abut on the switch SW1, and an attachment/detachment lock pin 23*c* protruding to a side of the microphone main body 3.

The spring support pin 23*a* is inserted into a spring 22 and supports the spring 22. When the slide member 23 is slid to the side of the microphone head 2, the spring 22 is compressed. Therefore, the slide member 23 is energized in an extending direction (to the side of the microphone main body 3).

Further, the pressing pin 23*b* is arranged at a side of the switch SW1, and the slide member 23 is slid to the side of the microphone head 2, so that the pressing pin 23*b* presses and causes the switch SW1 to be in a switch-ON state.

Further, as described above, when the slide member 23 is slid to the side of the microphone head 2, the slide member 23 is energized to the side of the microphone main body 3. Therefore, by releasing of a finger from the slide member 23, the slide member 23 is slid to the side of the microphone main body 3, and the pressing pin 23*b* is separated from the switch SW1.

Further, the attachment/detachment lock pin 23*c* is inserted into (locked with) an engaging hole 27 provided in the side of the microphone main body 3, when the microphone head 2 is coupled with the microphone main body 3, as illustrated in FIG. 3. Therefore, when the microphone head 2 is detached from the microphone main body 3, the slide member 23 is slid to the side of the microphone head 2, the attachment/detachment lock pin 23*c* is caused to be in a pulled out state from the engaging hole 27, and the microphone head 2 needs to be rotated around the axis.

Further, the approximately cylindrical grip end member 25 made of metal (for example, made of brass) is rotatably fit to a rear end of the cover member 5 around the axis, and a screw groove (not illustrated) is formed in an inner peripheral surface of the grip end member 25.

Meanwhile, a screw groove (not illustrated) that can be screwed with the screw hole of the side of the grip end member 25 is formed in a rear portion of the main body member 4, which is covered with the cover member 5.

Coupling of the cover member 5 and the microphone head 2 is performed such that the grip end member 25 and the rear portion side of the main body member 4 are screwed with each other, so that a front end of the cover member 5 abuts on and is fixed to a rear end side of the microphone head 2.

Further, at this time, the slide member 23 is covered with the cover member 5, and is not exposed outside. Accordingly, an accident of careless sliding of the slide member 23 can be prevented.

Further, a main body-side mute control circuit 21 (second mute control circuit) as illustrated in FIG. 7 is provided on the contact substrate 6 of the main body member 4, which is connected with the microphone-side pins M1 and M2.

The main body-side mute control circuit 21 includes a main body-side terminal B1 that comes in contact with the microphone-side pin M1 when the microphone head 2 is coupled, a main body-side terminal B2 that comes in contact with the microphone-side terminal M2, an npn-type transistor T1 as a switching element, and a microprocessor unit (called MPU) 29 that causes an audio mute circuit to operate. The main body-side terminal B1 is connected to a base of the npn-type transistor T1, a collector is hung on high (H) through a resistance R3, and an emitter is connected to the main body-side terminal B2. Further, a resistance R2 is provided between the main body-side terminal B1 and the main body-side terminal B2.

Next, operations of the mute control circuits 20 and 21 associated with attaching/detaching work of the microphone head 2 to the microphone main body 3 will be described.

Figure 8A:
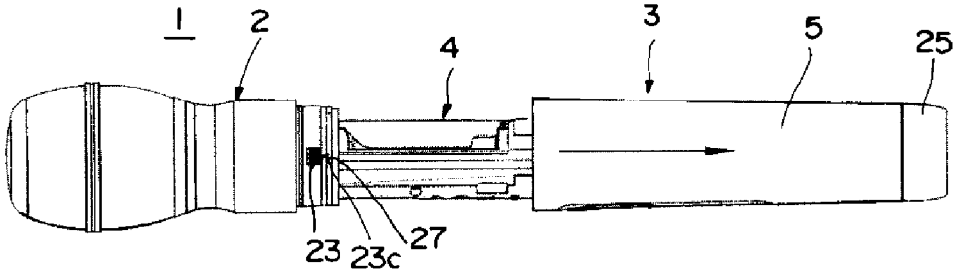
FIGS. 8A to 8C are side views for describing an operation of a mute control circuit associated with attaching/detaching work of the microphone head to/from the microphone main body.

When the microphone head 2 is detached from the microphone main body 3, first, the screwed grip end member 25 and main body member 4 are released, and as illustrated in FIG. 8A, the microphone head 2 and the cover member 5 are separated, and the slide member 23 is exposed.

Figure 8B:
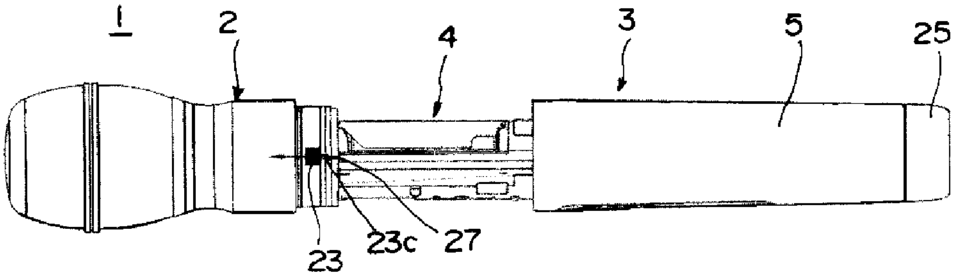

Next, as illustrated in FIG. 8B, the slide member 23 is slid to the side of the microphone head 2 as shown by an arrow. Accordingly, the attachment/detachment lock pin 23*c* is pulled out from the engaging hole 27, and the switch SW1 is turned ON. In this state, connection between the microphone-side pins M1 and M2, and the main body-side terminals B1 and B2 is maintained. Accordingly, the base and the emitter of the transistor T1 become the same potential, and the transistor T1 is turned from ON to OFF. Therefore, an input port of the MPU 29 become high (H) from low (L) by the collector of the transistor T1, and the mute circuit is driven having the state as a mute command signal.

Figure 8C:
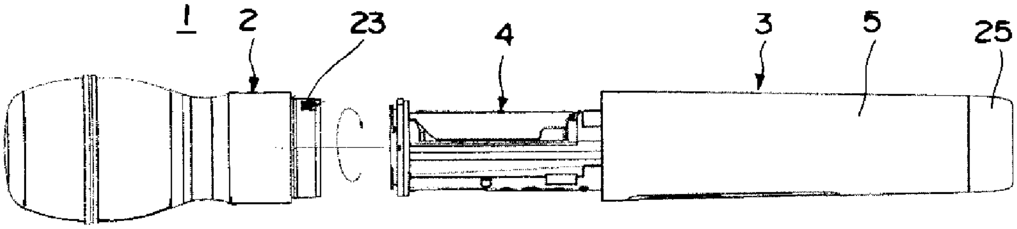
Figure 9:
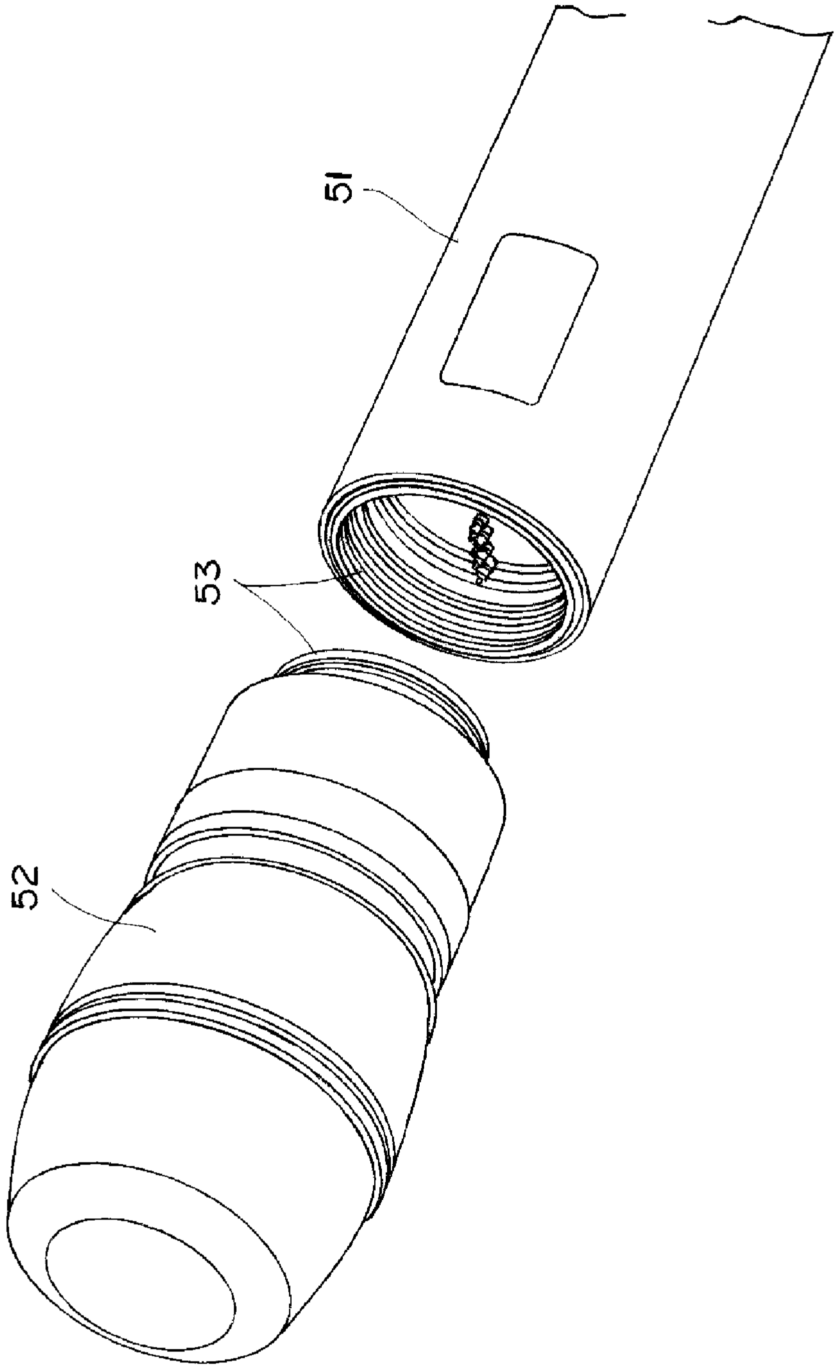
Fig. 9 Prior Art
FIG. 9 is a perspective view illustrating an example of a coupling system of a microphone head and a microphone main body in a conventional microphone.

Next, as illustrated in FIG. 8C, the microphone head 2 is rotated around the axis with respect to the main body member 4 by a predetermined angle as shown by an arrow, and the microphone head 2 is separated from the main body member 4. At this time, the microphone-side pins M1 and M2 and the main body-side terminals B1 and B2 are separated. However, the high (H) signal of the input port of the MPU 29 is maintained by the main body-side mute circuit 21, and the mute circuit is kept driven.

Meanwhile, when the microphone head 2 is attached to the microphone main body 3, the microphone head 2 and the main body member 4 are coupled in a state where the slide member 23 is slid to the side of the microphone head 2.

At this time, the switch SW1 is ON, and even when the microphone-side pins M1 and M2 and the main body-side terminals B1 and B2 are brought to come in contact with other, the high (H) signal of the input port of the MPU 29 is maintained, and the mute circuit is kept driven.

Then, when the microphone head 2 and the main body member 4 are completely coupled, and the attachment/detachment lock pin 23*c* of the slide member 23 is inserted into the engaging hole 27 provided in the side of the microphone main body, the switch SW1 is turned OFF. Further, when the switch SW1 is turned OFF, the transistor T1 is turned from OFF to ON, the collector of the transistor T1 supplies a low (L) signal to the input port of the MPU 29, and the driving of the mute circuit is stopped (mute operation is released).

Finally, the rear portion of the main body member 4 and the grip end member 25 are screwed, so that the main body member 4 is completely covered with the cover member 5 (that is, the slide member 23 is covered with the cover member 5), coupling of the microphone head 2 and the microphone main body 3 is completed.

As described above, according to an embodiment of the present invention, as the coupling system of the microphone head 2 and the main body member 4, the bayonet-type coupling has been employed. Therefore, the microphone head 2 is rotated around the axis with respect to the main body member 4 by the predetermined angle, so that the microphone head 2 and the main body member 4 can be easily attached/detached.

Further, the mute control circuits 20 and 21 are separately provided to the contact substrate 11 of the microphone head 2 and to the contact substrate 6 of the microphone main body 3, and the mute circuit is always driven during the attaching/detaching operation. Therefore, not only after the microphone head 2 is detached from the microphone main body 3, but also during the attaching/detaching operation, occurrence of the pop noise can be prevented.

Note that, in the above embodiment, the wireless microphone has been exemplarily described as the microphone. However, the microphone according to the present invention can be also applied to a wired microphone.

What is claimed is:

1. A microphone comprising:

a microphone main body;

a microphone head detachably mounted to the microphone main body, and including a microphone unit that performs sound collection;

a mute circuit provided to a side of the microphone main body, and configured to be driven by an input of a mute command signal;

a first mute control circuit provided to a side of the microphone head, and including a switch that switches disconnection or conduction of a wire;

a second mute control circuit provided to the side of the microphone main body, and configured to be electrically connected with the first mute control circuit when the microphone head is coupled to the microphone main body, and is attached to or detached from the microphone main body, the second mute control circuit generating the mute command signal; and a slide member provided in the microphone head and configured to operate switching of the switch of the first mute control circuit, the slide member switching lock or unlock of rotation of the microphone main body around an axis relative to the microphone head, wherein in a position of the slide member where the wire of the first mute control circuit is conducted by the switch, the rotation of the microphone main body around the axis relative to the microphone head is unlocked, and the second mute control circuit outputs the mute command signal when the first mute control circuit and the second mute control circuit are electrically connected, and the wire of the first mute control circuit is conducted by the switch, or when the first mute control circuit and the second mute control circuit are electrically disconnected.

2. The microphone according to claim 1, wherein the microphone head and the microphone main body are coupled by a bayonet-type coupling mechanism.

3. The microphone according to claim 1, wherein the microphone main body includes a main body member including the second mute control circuit connectable with the first mute control circuit at the side of the microphone head, and a cover member configured to cover the main body member, and the cover member is coupled to the side of the microphone head, in a state of covering the slide member provided to the side of the microphone head.

4. The microphone according to claim 2, wherein the microphone main body includes a main body member including the second mute control circuit connectable with the first mute control circuit at the side of the microphone head, and a cover member configured to cover the main body member, and the cover member is coupled to the side of the microphone head, in a state of covering the slide member provided to the side of the microphone head.

5. A microphone having a microphone head detachably mounted to a microphone main body, the microphone head including a microphone unit that performs sound collection, the microphone comprising:

a mute circuit provided to a side of the microphone main body, and configured to be driven by an input of a mute command signal;

a first mute control circuit provided to a side of the microphone head, and including a switch that switches disconnection or conduction of a wire;

a second mute control circuit provided to the side of the microphone main body, and configured to be electrically connected with the first mute control circuit when the microphone head is coupled to the microphone main body, is attached to or detached from the microphone main body, the second mute control circuit generating the mute command signal; and a slide member provided in the microphone head, and configured to operate switching of the switch of the first mute control circuit, wherein in a position of the slide member, where the wire of the first mute circuit is caused to be connected by the switch, rotation of the microphone main body around an axis is locked by the slide member, and the second mute control circuit outputs the mute command signal, when the first mute control circuit and the second mute control circuit are electrically connected, and the wire of the first mute control circuit is conducted by the switch, or when the first mute control circuit and the second mute control circuit are electrically disconnected.

* * * * *